US006467264B1

(12) United States Patent
Stephenson et al.

(10) Patent No.: US 6,467,264 B1
(45) Date of Patent: Oct. 22, 2002

(54) HYDRAULIC CIRCUIT WITH A RETURN LINE METERING VALVE AND METHOD OF OPERATION

(75) Inventors: Dwight B. Stephenson, Delafield, WI (US); Joseph Lawrence Pfaff, Wauwatosa, WI (US)

(73) Assignee: Husco International, Inc., Waukesha, WI (US)

( * ) Notice: Subject to any disclaimer, the term of this patent is extended or adjusted under 35 U.S.C. 154(b) by 0 days.

(21) Appl. No.: 09/847,834

(22) Filed: May 2, 2001

(51) Int. Cl.[7] .......................... F16D 31/02; F16D 39/00

(52) U.S. Cl. ............................ 60/460; 60/368; 60/494; 60/484; 91/454

(58) Field of Search .......................... 60/460, 466, 494, 60/484, 368; 91/444, 446, 455, 454, 456, 457, 459

(56) References Cited

U.S. PATENT DOCUMENTS 4,250,794 A * 2/1981 Haak et al. ............... 91/446 X
4,416,187 A * 11/1983 Nystrom ................... 91/454 X
4,811,649 A * 3/1989 Heusser .................... 91/454 X
4,989,495 A * 2/1991 Gabellini et al. ......... 91/457 X
5,036,877 A 8/1991 Distler et al.
5,072,752 A 12/1991 Kolchinsky
5,143,115 A 9/1992 Geyler, Jr.
5,165,320 A * 11/1992 Ravn ........................ 91/454 X
5,174,544 A 12/1992 Emanie
5,878,647 A * 3/1999 Wilke et al. .............. 91/454 X
5,960,695 A * 10/1999 Aardema et al. ......... 91/454 X
6,149,124 A 11/2000 Yang
6,196,247 B1 * 3/2001 Knoell et al. ............. 91/446 X
6,293,181 B1 * 9/2001 Hajek, Jr. et al. ......... 91/446 X

OTHER PUBLICATIONS

A. Jansson and J. Palmberg, *Separate Controls of Meter–in Meter–out Orifices in Mobile Hyraulic Systems* SAE Technical Paper Series No. 901583, 1990, Society of Automotive Engineers Warrendale PA.

* cited by examiner

*Primary Examiner*—John E. Ryznic
(74) *Attorney, Agent, or Firm*—George E. Haas; Quarles & Brady LLP

(57) ABSTRACT

A hydraulic system controls the flow of fluid to and from several functions on a machine. Each function has a valve assembly through which fluid is supplied under pressure from a source to an actuator and through which fluid returns from the actuator to a shared return line connected by a return line metering valve to the system tank. There are several regeneration modes of operation in which fluid exhausted from one port is supplied into the other port of the same actuator, which eliminates or reduces the amount of hydraulic fluid that must be supplied from the source. In some regeneration modes, input fluid for an actuator is obtained from another hydraulic function via the shared return line. In these regeneration modes an electronic controller operates the return line metering valve to restrict fluid from flowing into the tank from the shared return line, so that the fluid will be available to be supplied into an actuator port.

28 Claims, 3 Drawing Sheets

| MODE \ VALVE | VALVE 21 | VALVE 22 | VALVE 23 | VALVE 24 | VALVE 46 |
|---|---|---|---|---|---|
| EXTEND | MODULATE | CLOSED | CLOSED | MODULATE | OPEN |
| RETRACT | CLOSED | MODULATE | MODULATE | CLOSED | OPEN |
| FLOAT | CLOSED | OPEN | CLOSED | OPEN | OPEN |
| UNPOWERED METERED RETRACT | CLOSED | MODULATE | CLOSED | OPEN | MODULATE |
| POWERED REGENERATION EXTEND | MODULATE | CLOSED | OPEN | CLOSED | DO NOT CARE |
| UNPOWERED REGENERATION EXTEND | MODULATE | CLOSED | MODULATE REVERSE | CLOSED | DO NOT CARE |
| TANK MAKE UP | CLOSED | OPEN | CLOSED | MODULATE | MODULATE |
| TANK & PUMP MAKE UP | MODULATE | MODULATE REVERSE | CLOSED | MODULATE | MODULATE |

FIG. 4

HYDRAULIC CIRCUIT WITH A RETURN LINE METERING VALVE AND METHOD OF OPERATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic circuits that operate machinery; and more particularly to controlling the pressure and flow of hydraulic fluid supplied to power actuators of that machinery.

2. Description of the Related Art

A wide variety of machines have working members that are driven by hydraulic cylinder and piston assemblies. Each cylinder is divided into two internal chambers by the piston and selective application of hydraulic fluid under pressure to either of the chambers moves the piston in a corresponding direction. While that action is occurring, fluid is being drained or exhausted, from the other,cylinder chamber to a tank for the hydraulic system.

Traditionally the flow of hydraulic fluid to and from the cylinder was controlled by a manually operated valve, such as the one described in U.S. Pat. No. 5,579,642. There is a trend away from manually operated hydraulic valves toward electrically controlled solenoid valves. This change in technology facilitates computerized regulation of various machine functions. Electrical control also simplifies the plumbing of the hydraulic system, as the control valves can be located near each cylinder and not at the operator station. Thus only a single pair of pump and tank lines needs to be run to the hydraulic actuators throughout the machine. Although separate electrical wires may have to be run to each valve, those wires are easier to run and maintain as compared to hydraulic lines.

Electrically controlled metering valves have a potential problem of not closing when commanded because an obstruction across a metering element due to fluid contamination causes the solenoid armature to hang up. Under that circumstance, control of the cylinder and of the machine member operated by the cylinder are lost. This can create a potentially hazardous situation where an open valve allows fluid to drain from the cylinder causing the machine member to drop by gravity.

Another condition occurs where a single pump provides pressurized fluid to several functions on the machine. For example, an excavator has a boom coupled to an arm that has a movable bucket at a remote end. Each of these three components is operated independently by a separate hydraulic cylinder. During complex motion, the boom may be lowering by gravity with the exhausting hydraulic fluid draining directly to tank, while the arm is being powered by pressurized fluid from the pump. In this situation, energy in the exhausting fluid is being lost and additional power has to be consumed by the pump to provide the pressurized fluid for operating the arm and possibly other functions on the machine. This limits the rate of those powered functions and corresponding slows work function cycle time. Thus there is a degree of inefficiency to this operation.

A further concern in hydraulic systems is that some valves are sensitive to the pressure drop across their metering elements. Specifically, the resolution of the metering may be compromised as the pressure drop increases. FIG. 1 illustrates the typical relationship between the electrical current applied to the valve actuator and the flow rate of fluid through the valve at different pressure drops across the valve. As can be seen, a change in the actuator current from level I1 to a higher level I2 produces a relatively small change in the flow rate when the pressure differential is relatively low, for example 20 bar. In contrast at a greater pressure drop, such as 200 bar, the same change in valve actuator current (I1 to I2) produces a much greater change in the flow rate. In other words, the lower the pressure drop across the valve element, the resolution of flow metering becomes finer.

As a consequence, a small error in the control of the actuator current or a small change in the valve response can have a dramatic impact on the flow rate at higher pressure drops. This can result in a significant difference in the movement of the machine member being controlled by the valve. Thus, if fine metering control is desired, the pressure drop across the valve has to be maintained at a relatively small level, or very accurate control of the actuator current must be accomplished.

SUMMARY OF THE INVENTION

The present invention provides an improved hydraulic system that addresses each of these concerns.

That hydraulic system has a source of hydraulic fluid under pressure and a tank for storing hydraulic fluid. A shared fluid return line is connected to the tank by an electrically driven return line valve. A source sensor provides a signal that indicates the pressure of the hydraulic fluid from the source and a tank sensor produces another signal denoting the pressure in the shared fluid return line.

A plurality of hydraulic functions are connected to the source of pressurized fluid and the shared fluid return line in order to operate mechanical members on a machine. At least one of those hydraulic functions comprises an actuator, such as a bidirectional hydraulic cylinder, with first and second ports. A first control valve connects the source to the first port of the actuator and a second control valve couples the first port to the shared fluid return line. A third control valve governs fluid flow between the source and the second port of the actuator, while a fourth control valve connects the second port to the shared fluid return line. This function also has a first sensor which generates a signal indicating the hydraulic pressure at the first port, and the pressure at the second port is evidenced by a signal from a second sensor.

An electronic controller has inputs connected to the source sensor, tank sensor, first sensor and the second sensor and has outputs connected to the first, second, third and fourth control valve, as well as the return line valve. The controller operates selective ones of the control valves to produce desired amounts of movement of the actuator. The controller responds to the pressure indicating signals from respective ones of the sensors by operating the return line valve to control the pressure in the shared fluid return line.

The hydraulic system has several regeneration modes of operation in which fluid being exhausted from one port of the actuator is supplied into the other actuator port. This regeneration either eliminates or drastically reduces the amount of hydraulic fluid that must be supplied from the source to the actuator. Thus the amount of energy needed to power the source of pressurized fluid and the time to accomplish function operations are reduced. In the regeneration mode of gravity lowering (potential energy) or inertia braking (kinetic energy), make-up fluid is obtained from another hydraulic function on the machine via the shared fluid return line to feed into a port of the actuator. In these regeneration modes the controller operates the return line valve to restrict fluid from flowing into the tank from the shared return line, so that fluid will be available to be supplied into an actuator port.

The return line valve also is operated to pressurize the shared fluid return and decrease the pressure drop across a control valve. By reducing the pressure drop, the flow metering resolution of that control valve is improved for better control of the actuator. Metering improvement also can be regulated within the four way valve.

BRIEF DESCRIPTION OF THE DRAWINGS

FIG. 4 is a table denoting different operating mode of the hydraulic system.

DETAILED DESCRIPTION OF THE PRESENT INVENTION

Figure 2:
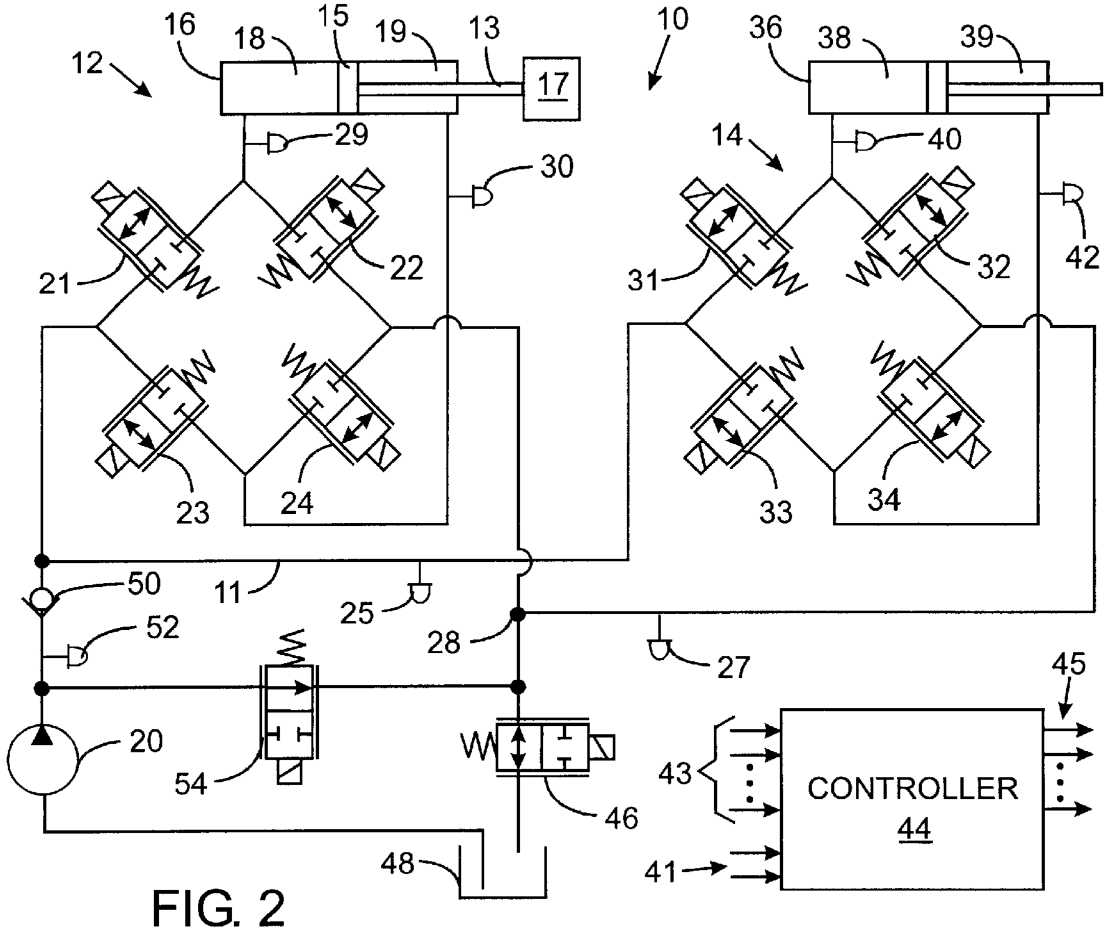
FIG. 2 is a schematic diagram of a hydraulic system which incorporates the present invention.

With reference to FIG. 2, a hydraulic system 10 controls two separate functions 12 and 14 on a machine which are supplied with pressurized fluid via a common supply line 11. It should be understood that additional functions also may be powered by this system. The first function 12 has a first hydraulic cylinder 16 containing a piston 15 that is connected by a rod 13 to drive a member on the machine, as represented by load 17. The piston divides the internal cavity of the cylinder 16 into a head chamber 18 and a rod chamber 19, both of which are connected to an array of four bidirectional, proportional control valves 21, 22, 23 and 24 that are electrically operated by solenoids. The first control valve 21 controls the flow of hydraulic fluid from a pump 20 to the head chamber 18. The second bidirectional, proportional control valve 22 regulates the flow of fluid between the head chamber 18 and a shared return line 28. Similarly, the third proportional control valve 23 governs the flow of hydraulic fluid from the pump 20 to the rod chamber 19, and the fourth proportional valve 24 controls the flow of fluid between the rod chamber 19 and the shared return line 28. By simultaneously operating different combinations of the control valves 21–24, hydraulic fluid from the pump 20 can be applied to one of the cylinder chambers 18 or 19 and exhausted to the shared return line 28 from the other chamber 19 or 18. This selective operation of pairs of the four control valves 21–24 drives the piston 15 in one of two directions thereby producing a corresponding movement of the machine member to which the piston is connected.

Two pressure sensors 29 and 30 produce electrical signals indicating the pressure within hydraulic lines connected to head and rod chambers 18 and 19, respectively. Another pressure sensor 25 produces an electrical signal denoting the pressure at the outlet of the pump 20. A fourth pressure sensor 27 generates a signal indicative of the pressure in the shared return line 28.

Another pressure sensor 52 is located between the pump 20 and a check valve 50 connected to the supply line 11 and detects the pump's output pressure. A unidirectional flow valve 54 is connected between the pump output and the common return line to provide a bidirectional checking function.

The second function 14 has a similar array of bidirectional, proportional control valves 31, 32, 33 and 34 which selectively control the flow of hydraulic fluid between a second cylinder 36 and each of the pump 20 and shared return line 28. The cylinder 36 has a head chamber 38 and a rod chamber 39. As with the first function 12, activating the control valves 31–34 in the second function 14 selectively applies pressurized fluid to one of the cylinder chambers 38 or 39 in the second cylinder and exhausts fluid from the other chamber 39 or 38. The second function 14 has a pressure sensor 40 connected to the hydraulic line for the head chamber 38, and another pressure sensor 42 connected to the hydraulic line for the rod chamber 39.

The hydraulic system 10 also includes a proportional return line metering valve 46 that connects the shared return line 28 to the tank 48 for the hydraulic system 10. The return line metering valve also is electrically operated by a solenoid.

The signals from the various pressure sensors 25, 27, 29, 30, 40 and 42 are connected as inputs 43 to an electronic controller 44 which also receives a signal on lines 41 from an input device that is manipulated by an operator of the machine in which the hydraulic system 10 is incorporated. For example, the input device may be a joystick wherein in movement along one axis controls the operation of th first hydraulic cylinder 16, and movement along an orthogonal axis controls movement of the second hydraulic cylinder 36. That is, the direction and degree to which the joystick is moved along one of the axes by the operator, determines the direction and amount of movement of the corresponding cylinder 16 or 36. The controller 44 contains a microcomputer which executes a software program that responds to the input signals from the joystick, by producing the appropriate signals at outputs 45 for activating the solenoids of the control valves 21–24, 31–34, and 46. At the same time, the system controller 44 monitors the pressure from the various sensors to ensure that proper operation of the hydraulic system is occurring.

Figure 3:
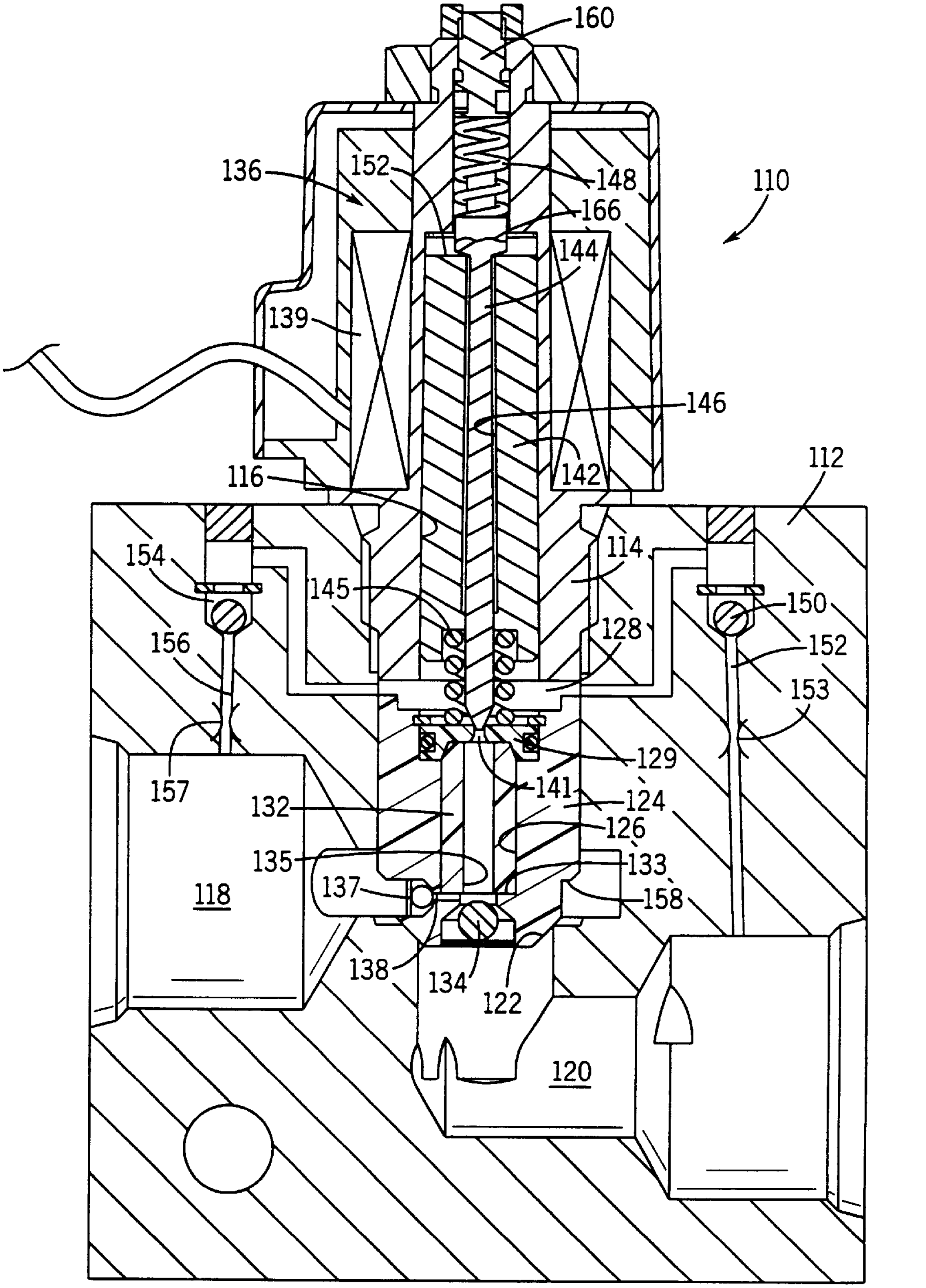
FIG. 3 is a cross sectional view of a bidirectional proportional metering valve that is used in the hydraulic system.

FIG. 3 illustrates the details of the bidirectional, proportional control valves used in the hydraulic system 10. The exemplary valve 110 comprises a cylindrical valve cartridge 114 mounted in a longitudinal bore 116 of a valve body 112. The valve body 112 has a transverse first port 118 which communicates with the longitudinal bore 116. An second port 120 extends through the valve body and communicates with an interior end of the longitudinal bore 116. A valve seat 122 is formed between the first and second ports 118 and 120.

A main valve poppet 124 slides within the longitudinal bore 116 with respect to the valve seat 122 to selectively control flow of hydraulic fluid between the first and second ports. A central bore 126 is formed in the main valve poppet 124 and extends from an opening at the second port 120 to a second opening into a control chamber 128 on the remote side of the main valve poppet. The central bore 126 has a shoulder 133 spaced from the first end that opens into the second port 120. A first check valve 134 is located in the main valve poppet between the shoulder 133 and the first opening to allow fluid to flow only from the poppet's central bore 126 into the second port 120.

A second check valve 137 is located within the main valve poppet 124 in a passage 138 that extends between the first port 118 and the central bore 126 adjacent to the shoulder 133. The second check valve 137 limits fluid flow in the passage 138 to only a direction from the poppet bore 126 to the first port.

The second opening of the bore 126 in the main valve poppet 124 is closed by a flexible seat 129 with a pilot aperture 141 extending there through. A resilient tubular column 132, within the central bore 126, biases the flexible seat 129 with respect to the shoulder 133. Opposite sides of the flexible seat 129 are exposed to the pressures in the control chamber 128 and in a pilot passage 135 formed in the main valve poppet 124 by the tubular column 132.

The valve body 112 incorporates a third check valve 150 in a passage 152 extending between the control chamber 128 and the second port 120. The third check valve 150 allows fluid to flow only from the second port 120 into the control chamber 128. A fourth check valve 154 is located in another passage 156 to allow fluid to flow only from the first port 118 to the control chamber 128. Both of these check valve passages 152 and 156 have a flow restricting orifice 153 and 157, respectively.

Movement of the main valve poppet 124 is controlled by a solenoid 136 comprising an electromagnetic coil 139, an armature 142 and a pilot poppet 144. The armature 142 is positioned within a bore 116 through the cartridge 114 and a first spring 145 biases the main valve poppet 124 away from the armature. The electromagnetic coil 139 is located around and secured to cartridge 114. The armature 142 slides within the cartridge bore 116 away from main valve poppet 124 in response to an electromagnetic field created by applying electric current to the electromagnetic coil 139. The pilot poppet 144 is located within a bore 146 of the tubular armature 142 and is biased into the armature by a second spring 148 that engages an adjusting screw 160.

In the de-energized state of the electromagnetic coil 139, the second spring 148 forces the pilot poppet 144 against end 152 of the armature 142, pushing both the armature and the pilot poppet toward the main valve poppet 124. This results in a conical tip of the pilot poppet 144 entering and closing the pilot aperture 141 in the resilient seat 129 and the pilot passage 135, thereby closing fluid communication between the control chamber 128 and the second port 120.

The solenoid valve 110 proportionally controls the flow of hydraulic fluid between the first and second ports 118 and 120. The electric current generates an electromagnetic field which draws the armature 142 into the solenoid 136 and away from the main valve poppet 124. The magnitude of that electric current determines the amount that the valve opens and the rate of hydraulic fluid flow through the valve is proportional to that current. Specifically, when the pressure at the first port 118 exceeds the pressure at the pressure at second port 120, the higher pressure is communicated to the control chamber 128 through the fourth check valve 154. As the armature 142 moves, head 166 on the pilot poppet 144 is forced away from the main valve poppet 124 opening the pilot aperture 141. That action results in hydraulic fluid flowing from the first port 118 through the control chamber 128, pilot passage 135 and the first check valve 134 to the second port 120.

The flow of hydraulic fluid through the pilot passage 135 reduces the pressure in the control chamber 128 to that of the second port 120. Thus the higher pressure in the first port 118 that is applied to the surface 158 forces main valve poppet 124 away from valve seat 122 thereby opening direct communication between the first port 118 and second port 120. Movement of the main valve poppet 124 continues until a pressure of force balance is established across the main poppet 124 due to constant flow through the orifice 157 and the effective orifice of the pilot opening to the pilot aperture 141. Thus, the size of this valve opening and the flow rate of hydraulic fluid there through are determined by the position of the armature 142 and pilot poppet 144. Those positions are in turn controlled by the magnitude of current flowing through electromagnetic coil 139.

When the pressure in the second port 120 exceeds the pressure in the inlet port 118, proportional flow from the outlet port to the inlet port can be obtained activating the solenoid 136. In this case the higher second port pressure is communicated through the third check valve 154 to the control chamber 128 and when the pilot poppet 144 moves away from the pilot seat 129 fluid flows from the control chamber, pilot passage 135 and second check valve 137 to the first port 118. This results in the main valve poppet 124 opening due to the higher pressure acting on its bottom surface.

Returning to FIG. 2, the return line metering valve 46 can act as a safety shut-off in the event that the second or fourth control valve 22 or 24 becomes stuck in the open position due to fluid contamination for example. In that event, the stuck valve allows fluid from the first cylinder 16 to drain to the tank 48 which could result in inadvertent motion. This condition is evidenced by pressure in the rod chamber 19, as indicated by sensor 30, being very high and very low or negative pressure in the head chamber 18, as indicated by sensor 29. Alternatively a position or rate sensor on the actuator could provide a signal evidencing a stuck open valve.

The controller 44 periodically monitors the signals from pressure sensors 29 and 30 and can detect these pressure conditions even when the controller is not commanding movement of the first cylinder 16. Thus the controller will recognize that these conditions should not be occurring and that a fault must exist. As a result, the controller 44 responds by closing the return line metering valve 46 to block the flow of fluid from the cylinder 16 to the system tank 48, which action terminates further dropping of the load 17. Because this an emergency condition, the controller also shuts down the other hydraulic functions as the path to system tank has been closed for all functions.

In another situation, the main poppet in the supply to work port control valve may be blocked open by contaminant. If that damaged valve is in neutral and another lower pressure function is actuated, the load of the damaged valve will drop thereby feeding oil to the other active function. To prevent this inadvertent load dropping, the controller can detect the malfunction by pressure decay and cavitation in the opposite chamber of the function that is in neutral, by a position sensor indicating uncommanded motion to the controller, or by the static pressure between the supply line check valve 50 and the damaged valve work port remains the same. Upon detecting this failure, dropping of the load is prevented by not commanding any function and the check valve in the supply line.

The hydraulic system 10 with the return line metering valve 46 shown in FIG. 2 has multiple operating modes as depicted in the table of FIG. 4. That table designates the states of the four bidirectional, proportional control valves 21–24 in each mode for the first function 12. The designated state of the return line metering valve 46 assumes that a different state is not being required by the operation of the second function 14. The first three modes forward, retract, and float are found in conventional hydraulic systems.

Before explaining those modes, it should be understood that reference herein to direction of movement, such as left and right, refer to the orientation of the first cylinder 16 as the illustrated in FIG. 2 and a skilled artisan will appreciate that other orientations can exist on particular machines. For example, the orientation of the first cylinder 16 could be such that gravity acting on the load 17 tends to retract the rod 13 into the cylinder in some applications of the hydraulic system and tends to extend the rod 13 from the cylinder in other applications.

The EXTEND mode occurs when the piston 15 is to move to the right in FIG. 2 thereby extending rod 13. At this time, the metering orifices of the first valve 21 and the fourth valve 24 are modulated, i.e. varied, by the controller 44 to regulate the flow of fluid to and from the first, cylinder 16 and thus the rate of movement. Specifically, pressurized fluid from the pump flows to the head chamber 18 through the first control valve 21 and fluid exits the rod chamber 19 through the fourth control valve 24. The other control valves 22, and 23 remain closed and the return line metering valve 46 is fully open.

In the RETRACT mode the piston 15 moves to the left in FIG. 2 wherein the rod 13 moves into the first cylinder 16. In this case, the rod chamber 19 receives pressurized fluid from the pump 20 through the third control valve 23 while the fluid is exhausted from the head chamber 18 via the second control valve 22.

In the FLOAT mode, the control valves 21 and 23 that are connected to the outlet of pump 20 are closed, while the two control valves 22 and 24 connected to the shared return line 28 remain fully open. The return line metering valve 46 is regulated to ensure that neither cylinder chamber cavitates. This allows fluid to be exhausted from either cylinder chamber 18 or 19 as external forces act on the piston 15.

The present hydraulic system 10 also has an UNPOWERED METERED RETRACT mode where the orientation of the first cylinder 16 is such that the force of gravity acting on the load 17 tends to react the rod 13. In this mode, the load force ejects fluid from the head chamber 18. Rather than simply exhausting all the hydraulic fluid oil from the head chamber 18 to the tank 48, that fluid can be utilized to fill the expanding rod chamber 19. To accomplish that, the second control valve 22 is modulated by the controller 44 to meter the fluid being exhausted from the head chamber 18 of the first cylinder 16 and thereby control the rate at which the load 17 is permitted to drop. At this time, the fourth control valve 24 is opened fully so that the exhausting fluid can flow into the expanding rod chamber 19. Because of the volume difference between the cylinder chambers, more fluid is exhausted from the head chamber 18 than can be accommodated in the rod chamber 19. That excess fluid flows to the shared return line 28.

Figure 1:
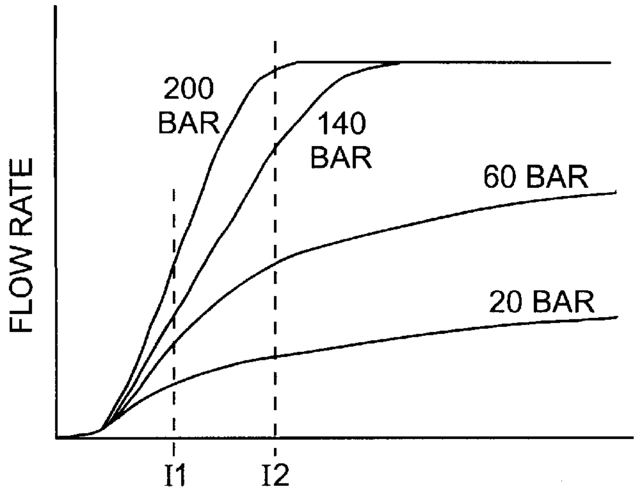
FIG. 1 graphically depicts the relationship between actuator current and fluid flow through a valve under different pressures.

In an UNPOWERED METERED RETRACT mode, the rate at which the loads drops is controlled by modulating the second control valve 22 which governs the flow of fluid leaving the head chamber 18. This creates a relatively large pressure differential across that second control valve 22. As described previously, relatively coarse flow control resolution exists when a high pressure drop occurs across a proportional valve, which can result in significant errors in controlling the velocity of the falling load 17. In other words, a small deviation in the current to the valve actuator can produce a large change in fluid flow, see FIG. 1. This results in a significant error between the actual velocity of the falling load and the desired velocity as commanded by the controller 44. However, the velocity error can be reduced by decreasing the pressure differential across the second control valve 22, thereby improving resolution of the flow control.

This is achieved in the present hydraulic system 10 by pressurizing the shared return line 28, which is accomplished by reducing the orifice of the return line metering valve 46 to restrict the fluid flow to the tank 48. The controller 44 monitors the pressure indicted by pressure sensor 29 in the line from the head chamber 18 and the pressure measured by the shared return line sensor 27. In response to those pressures, the controller partially closes the return line metering valve 46 until the desired pressure drop across the second control valve 22 is obtained. This alters the operating region of the second control valve 22 to minimize the effects of valve drift and hysteresis while providing greater accuracy in velocity control. Thus, the second control valve 22 and the return line metering valve 46 provide cascaded flow metering for an improved modulation range which enables more precise control of the lowering load 17.

Cavitation may also occur in the rod chamber 19 when that chamber expands faster that the flow of available fluid can fill the resultant voids. This condition is indicated by a very low pressure in the rod chamber as denoted by the signal from sensor 30. The controller 44 responds to that very low pressure signal with restricting the path to the system tank 48 by partially closing the return line metering valve 46 until the sensor 29 indicates that the pressure in the head chamber 18 has increased to a satisfactory level. In this situation the orifice provided by the return line metering valve 46 allows only an amount of fluid to flow to the tank that is in excess of that required to fill the expanding rod chamber 19.

The next mode operation in the table of FIG. 4 is the POWERED REGENERATION EXTEND mode. Here, the load 17 is being moved by applying pressurized fluid from the pump 20 to the head chamber 18 of the first cylinder 16. This flow of fluid is metered by modulating the first control valve 21 to produce a rate of movement desired by the controller 44.

However instead of exhausting the fluid in the rod chamber 19 to tank 48, that exhausting fluid is fed into the expanding head chamber 18 to reduce the amount of pump fluid that is required. Specifically the third control valve 23 is opened fully to convey that exhausting fluid to the inlet of the first control valve 21 where the fluid mixes with fluid from the pump 20. Because the piston surface area is greater in the head chamber 18 than in the rod chamber 19, the piston will extend in the POWERED REGENERATION EXTEND mode. In this mode less pump fluid is required than if the fluid exhausted from the rod chamber flowed to tank 48. As a consequence more pump fluid is available for simultaneously powering other functions of the hydraulic system.

During operation a function may change from a loaded, POWERED REGENERATION EXTEND mode to an over running load regeneration function. When this happens, limited control can be achieved with conventional spool valves that have fixed metering fluid between the rod chamber to pump. The present system enables reconstruction of the rod chamber to pump metering through reverse metering and maintains commanded velocity control even with an over running load.

The UNPOWERED REGENERATION EXTEND mode occurs when the load 17 acting on the piston 15 tends to extend the rod 13 from the first cylinder 16. This may occur due to gravity acting on a load, when the cylinder is oriented with the rod chamber 19 below the head chamber 18. This is similar to the UNPOWERED METERED RETRACT mode except that additional hydraulic fluid is required as the amount exhausted from the rod chamber is less than that required to fill the expanding head chamber.

Therefore, the third control valve 23 also is modulated to regulate the reverse flow of fluid exhausting from the rod chamber 19 and control the rate at which the load 17 drops. The first control valve 21 is modulated to meter the flow of fluid into the head chamber 18. Although little or no energy from the pump 20 needs to be exerted to lower the load, additional fluid is still required to fill that expanding head chamber 18. Thus the first control valve 21 is opened by an amount that is sufficient to allow enough fluid from both the rod chamber an the pump 20 and to enter the head chamber to prevent cavitation. The regulation of the first control valve is determined from the signal produced by the pressure sensor 29, so that the pressure in the head chamber remains above a given level.

The return line metering valve 46 enables a variation of the UNPOWERED REGENERATION EXTEND mode in which the additional fluid to make up for the difference in chamber volumes comes from the shared return line 28. This can take place when another hydraulic function (e.g. function 14) is dumping fluid into that shared return line 28. This is referred to as the TANK MAKE UP mode. Here, the fourth control valve 24 is operated to modulate the flow of fluid from the rod chamber 19 and thus control the rate at which the load 17 is allowed to drop. The second control valve 22 is opened fully by the controller 44 to allow the fluid to flow freely into the expanding head chamber 18.

At the same time, the return line metering valve 46 is partially closed to pressurize the shared return line 28. This allows the fluid being exhausted from the other function 14 or from excess flow of a fixed displacement pump to flow to the first function 12 and through the second control valve 22 to make up for the deficiency in fluid volume needed to fill the expanding head chamber 18. While this is occurring the controller 44 monitors the signal from the head chamber pressure sensor 29. Should that pressure drop below a given threshold the return line metering valve 46 is closed further to increase the pressure of the shared return line 28 and direct more fluid into the first function.

Another variation of the UNPOWERED REGENERATION EXTEND mode can be used to address a control problem that occures when the load 17 acting on the piston 15 tends to extend the rod 13 from the first cylinder 16. In order to control the velocity of the dropping load, the fourth control valve 24 must provide a relatively small metering orifice. However, because of the high fluid pressure drop across that orifice hysteresis and valve shift among other factors are magnified creating a velocity error (see FIG. 1).

This problem is solved by controlling the return line metering valve 46 to pressurize the shared return line 28. The second control valve 22 operated to control the flow into the head chamber 18 and thus regulate the velocity of the load, while the fourth control valve 24 is operated to perform pressure control at the rod chamber 19. In this situation, the operating region of the second control valve 22 minimizes the effects of hysteresis and valve shift to provide more accurate velocity control.

The final mode, TANK AND PUMP MAKE UP, is another variation of the UNPOWERED REGENERATION EXTEND mode where make up fluid is obtained from both the pump 20 and the shared return line 28. In this TANK AND PUMP MAKE UP mode, the return line metering valve 46 is fully closed. Here the rod 13 is being extended from the first cylinder 16 so that fluid is being exhausted from the rod chamber 19. That fluid flows through the fourth control valve 24 which modulates the fluid flow under control from controller 44. Because the return line metering valve 46 is closed this fluid can not flow to the tank 48 and is forced instead through the second control valve 22 which either is fully open or is being modulated by the controller 44 to regulate the rate of load movement. This also draws fluid being exhausted from the second function 14 into the first function 12 via the shared return line 28 However, the amount of fluid available from the shared return line may have to be supplemented with pressurized fluid from the pump 20 by modulating the first control valve 21. Nevertheless the TANK AND PUMP MAKE UP mode still consumes less fluid from the pump than in the conventional EXTEND mode. Furthermore, a variable displacement pump controlled by a conventional load sensing mechanism can operate in this latter mode to provide minimal pressure to the first function thereby conserving energy.

Another benefit of the return line regulation valve 46 is that of reducing metering noise. Cascaded pressure drop is an effective method to reduce metering noise.

I claim:

1. A hydraulic system comprising:

a source of hydraulic fluid under pressure;

a tank for hydraulic fluid;

a shared return line;

a return line metering valve connecting the shared return line to the tank;

a plurality of hydraulic functions connected to the source and to the shared return line for operating mechanical members on a machine, wherein at least one of the plurality of hydraulic functions comprises an actuator and a valve assembly which controls flow of fluid between the actuator and each of the source and the shared return line;

a sensor mechanism which senses a pressure drop across the valve assembly; and a controller having an input connected to the sensor mechanism and having an outputs connected to the valve assembly and the return line metering valve, the controller responding to a signal from the sensor mechanism by operating the return line metering valve to control an amount of pressure in the shared return line.

2. The hydraulic system as recited in claim 1 wherein the controller operates the return line metering valve to control a pressure differential across the valve assembly to a desired amount.

3. The hydraulic system as recited in claim 1 wherein while the controller is operating the valve assembly to apply fluid from the pump to the actuator, the controller is operating the return line metering valve to direct hydraulic fluid from the shared return line to the at least one of the plurality of hydraulic functions.

4. The hydraulic system as recited in claim 1 wherein the at least one of the plurality of hydraulic functions has a relatively low load pressure as compared to another one of the plurality of hydraulic functions, the controller operates valve assembly and the return line metering valve to produce a relatively high pressure differential across the valve assembly.

5. A hydraulic system comprising:

a source of hydraulic fluid under pressure;

a tank for hydraulic fluid;

a shared return line;

a return line metering valve connecting the shared return line to the tank;

a source sensor providing a signal indicating the pressure of hydraulic fluid from the source;

a return line sensor providing a signal indicating a level pressure of hydraulic fluid in the shared return line;

a plurality of hydraulic functions connected to the source and to the shared return line for operating mechanical members on a machine, wherein at least one of the plurality of hydraulic functions comprises:

(a) an actuator having first and second ports, (b) a first control valve connecting the source to the first port of the actuator, (c) a second control valve connecting the first port of the actuator to the shared return line, (d) a third control valve connecting the source to the second port of the actuator, (e) a fourth control valve connecting the second port of the actuator to the shared return line, (f) a first sensor producing a signal indicating a level pressure of hydraulic fluid at the first port, and (g) a second sensor producing a signal indicating a level pressure of hydraulic fluid at the second port; and a controller having inputs connected to the source sensor, return line sensor, first sensor and the second sensor and having outputs connected to the first control valve, second control valve, third control valve, fourth control valve and return line metering valve, the controller responding to the signals from respective ones of the sensors by operating the return line metering valve to control an amount of pressure in the shared return line.

6. The hydraulic system as recited in claim 5 wherein each of the first control valve, second control valve, third control valve, and fourth control valve is a bidirectional, proportional control valve.

7. The hydraulic system as recited in claim 5 wherein while the controller is operating one of the control valves to exhaust hydraulic fluid from one of the first and second ports, the controller is operating the return line metering valve to control a pressure differential across the one control valve to a desired amount.

8. The hydraulic system as recited in claim 5 wherein while the controller is operating selected ones of the control valves, the controller is operating the return line metering valve direct hydraulic fluid from the shared return line to the at least one of the plurality of hydraulic functions.

9. The hydraulic system as recited in claim 5 wherein the controller implements a unpowered metered retract mode of operation in which the second control valve is operated to modulate flow of hydraulic fluid being exhausted from the first port of the actuator, the fourth control valve is opened to allow exhausting hydraulic fluid to enter the second port and the return line metering valve is operated to restrict flow of hydraulic fluid thereby preventing a portion of the exhausting hydraulic fluid from flowing to the tank.

10. The hydraulic system as recited in claim 5 wherein the controller implements a powered regeneration extend mode of operation in which the first control valve is operated to modulate a flow of hydraulic fluid into the first port of the actuator, and the third control valve is opened to convey hydraulic fluid being exhausted from the second port to enter the first port.

11. The hydraulic system as recited in claim 5 wherein the controller implements a unpowered regeneration extend mode of operation in which the first control valve is operated to prevent cavitation of the hydraulic fluid into the first port of the actuator, and the third control valve is operated to modulate velocity of the actuator.

12. The hydraulic system as recited in claim 5 wherein the controller implements a tank make up mode of operation in which the second control valve is opened to convey hydraulic fluid to the first port of the actuator, the fourth control valve is operated to modulate flow of hydraulic fluid being exhausted from the second port, and the return line metering valve is operated to restrict flow of hydraulic fluid to the tank so that hydraulic fluid from another one of the plurality of hydraulic functions flows to the first port.

13. The hydraulic system as recited in claim 5 wherein the source comprises a positive displacement pump, and the controller implements a tank make up mode of operation in which the second control valve is opened to convey hydraulic fluid to the first port of the actuator, the fourth control valve is operated to modulate flow of hydraulic fluid being exhausted from the second port, and the return line metering valve is operated to restrict flow of hydraulic fluid to the tank so that excess hydraulic fluid from the positive displacement pump flows to the first port.

14. The hydraulic system as recited in claim 5 wherein the controller implements a tank and pump make up mode of operation in which the first control valve is operated to modulate a flow of hydraulic fluid to the first port of the actuator from the source, the second control valve is operated to modulate another flow of hydraulic fluid into the first port, the fourth control valve is operated to modulate flow of hydraulic fluid being exhausted from the second port, and the return line metering valve is operated to restrict flow of hydraulic fluid to the tank.

15. A method of operating a hydraulic system for a plurality of hydraulic functions on a machine, wherein one of the hydraulic functions includes an actuator with a first and second ports and includes a valve assembly which controls flow of hydraulic fluid under pressure from a source selectively to one of the first and second ports and the flow of fluid between the other one of the first and second ports and a shared return line for a plurality of functions, that method comprising:

sensing pressure of the hydraulic fluid provided by the source;

sensing pressure of the hydraulic fluid in the shared return line;

sensing pressure of hydraulic fluid at the first port;

sensing pressure of hydraulic fluid at the second port;

determining a desired pressure for the shared return line in response to the steps of sensing pressure; and operating a return line metering valve connected between the shared return line and a tank for the hydraulic system to control pressure in the shared return line to the desired pressure.

16. The method as recited in claim 15 wherein when the pressure sensed at one of the first and second ports is below a predefined level, the a return line metering valve is operated to increase the pressure in the shared return line.

17. The method as recited in claim 15 wherein operating a return line metering valve comprises responding to one of the steps of sensing pressure of hydraulic fluid at the first port and sensing,pressure of hydraulic fluid at the second port which indicates cavitation at the respective port by reducing fluid flow through the return line metering valve.

18. The method as recited in claim 15 further comprising sensing a fault when a load connected to the actuator is moving without being driven by the actuator; and closing the return line metering valve in response to sensing the fault.

19. The method as recited in claim 15 wherein operating a return line metering valve comprises responding to one of the steps of sensing pressure of hydraulic fluid at the first port and sensing pressure of hydraulic fluid at the second port which indicates cavitation at the respective port by terminating activation of the plurality of hydraulic functions.

20. The method as recited in claim 15 further comprising forming the valve assembly by:

connecting a first control valve between the source and the first port of the actuator;

connecting a second control valve between the first port of the actuator the shared return line;

connecting a third control valve between the source and the second port of the actuator; and connecting a fourth control valve between the second port of the actuator and the shared return line.

21. The method as recited in claim 20 further comprising implementing a unpowered metered retract mode of operation by operating the second control valve to modulate a flow of hydraulic fluid being exhausted from the first port of the actuator, opening the fourth control valve to allow exhausting hydraulic fluid to enter the second port, and operating the return line metering valve to restrict flow of hydraulic fluid to prevent a portion of the exhausting hydraulic fluid from flowing to the tank.

22. The method as recited in claim 20 further comprising implementing a powered regeneration extend mode of operation by operating the first control valve to modulate flow of hydraulic fluid into the first port of the actuator, and opening the third control valve to convey hydraulic fluid from the second port into the first port.

23. The method as recited in claim 20 further comprising implementing a unpowered regeneration extend mode of operation by operating the first control valve to modulate flow of hydraulic fluid into the first port of the actuator, and operating the third control valve to modulate flow of hydraulic fluid from the second port to the first port.

24. The method as recited in claim 20 further comprising implementing a tank make up mode of operation by opening the second control valve to convey hydraulic fluid into the first port of the actuator, operating the fourth control valve to modulate flow of hydraulic fluid being exhausted from the second port, and operating the return line metering valve to restrict flow of hydraulic fluid to the tank so that hydraulic fluid from another one of the plurality of hydraulic functions flows into the first port.

25. The method as recited in claim 20 further comprising implementing a tank and pump makeup mode of operation by operating the first control valve to modulate flow of hydraulic fluid into the first port of the actuator from the source, operating the second control valve to modulate a flow of additional hydraulic fluid into the first port, operating the fourth control valve to modulate flow of hydraulic fluid being exhausted from the second port, and operating the return line metering valve to restrict flow of hydraulic fluid to the tank.

26. A hydraulic system comprising:

a supply line coupled to a source of hydraulic fluid under pressure;

a tank for hydraulic fluid;

a return line;

a return line metering valve connecting the return line to the tank;

a plurality of hydraulic functions each of which comprises an actuator and a first valve element coupling the actuator to the supply line and a second valve element coupling the actuator to the return line;

a sensor mechanism which senses pressure across one of the first valve element and the second valve element in one of the plurality of hydraulic functions; and a controller having an input connected to the sensor mechanism and having outputs connected to the first valve element and second valve element of each of the plurality of hydraulic functions and to the return line metering valve, the controller responding to a signal from the sensor mechanism by operating the return line metering valve to control pressure in the shared return line.

27. The hydraulic system as recited in claim 26 wherein the controller operates the return line metering valve to control a pressure differential across one of the first valve element and the second valve element in the one of the plurality of hydraulic functions to a desired amount.

28. The hydraulic system as recited in claim 26 wherein while the controller is opening the first valve element of one of the plurality of hydraulic functions, the controller is operating the return line metering valve to direct hydraulic fluid from the shared return line to another one of the plurality of hydraulic functions.

* * * * *